March 26, 1968 NAOTOSHI OTSUKA ET AL 3,374,961

TRAVERSE MECHANISM

Filed Jan. 26, 1965 5 Sheets-Sheet 1

TRAVERSE MECHANISM

Filed Jan. 26, 1965

3,374,961

TRAVERSE MECHANISM

Naotoshi Otsuka, Mishima-shi, and Masayuki Nozawa, Numazu-shi, Japan, assignors to Toshiba Machine Co., Ltd., Tokyo, Japan, a corporation of Japan Filed Jan. 26, 1965, Ser. No. 428,036
Claims priority, application Japan, Jan. 27, 1964, 39/3,710
5 Claims. (Cl. 242—43)

ABSTRACT OF THE DISCLOSURE

An improved rotary mechanism for traversing yarn is provided by traversing the yarn over oppositely rotating rotary wings rather than the grooved cam mechanism in conventional yarn traverse mechanisms presently employed. Rotary wings are fixed to the ends of rotary shafts at an appropriate distance from the center axis at opposite ends thereof. A rotary wing is rotated in the clockwise direction to move the supply yarn close to the forward end of the rotary wing from the left side of the bobbin along the convex end of a guide-part toward the right direction. As soon as the yarn is off the forward end of the rotary wing, the end of the other rotary wing is rotated in the opposite direction to catch the yarn and to move it along the aforementioned guide-part toward the left direction, to thereby wind the supply yarn onto the bobbin.

The present invention relates to traverse mechanism for imparting a traversing motion for use in a filament winding apparatus.

The conventional filament winding apparatus of prior art comprises providing a grooved cam mechanism operatively connected to the winding action of the winding apparatus as means for imparting a traversing motion to the filament to be wound, whereby the supply filament or yarn can be caused to effect a reciprocating motion. As a result, there occurs a considerable noise as well as impact at every reverse end of the traversing motion. Therefore, in order to perform a safe and efficient operation, it is considered that an economical maximum cycle of reciprocation should be 600 cycles of traverse motion per minute. Accordingly, the winding of supply yarn through the traverse motion has been carried out in the range of 600 cycles specified above.

The present invention contemplates the provision of an improved rotary mechanism of yarn traverse rotative each other in opposite directions instead of the grooved cam mechanism of prior art. Accordingly, by having overcome the above disadvantages in connection with the utilization of the conventional grooved cam mechanism, it is a principal object of the invention to provide a traverse mechanism for use in winding filament adapted for a high speed and high efficient operation as well as a mass production.

Further objects will be apparent from the specification and drawings in which.

Figure 1:
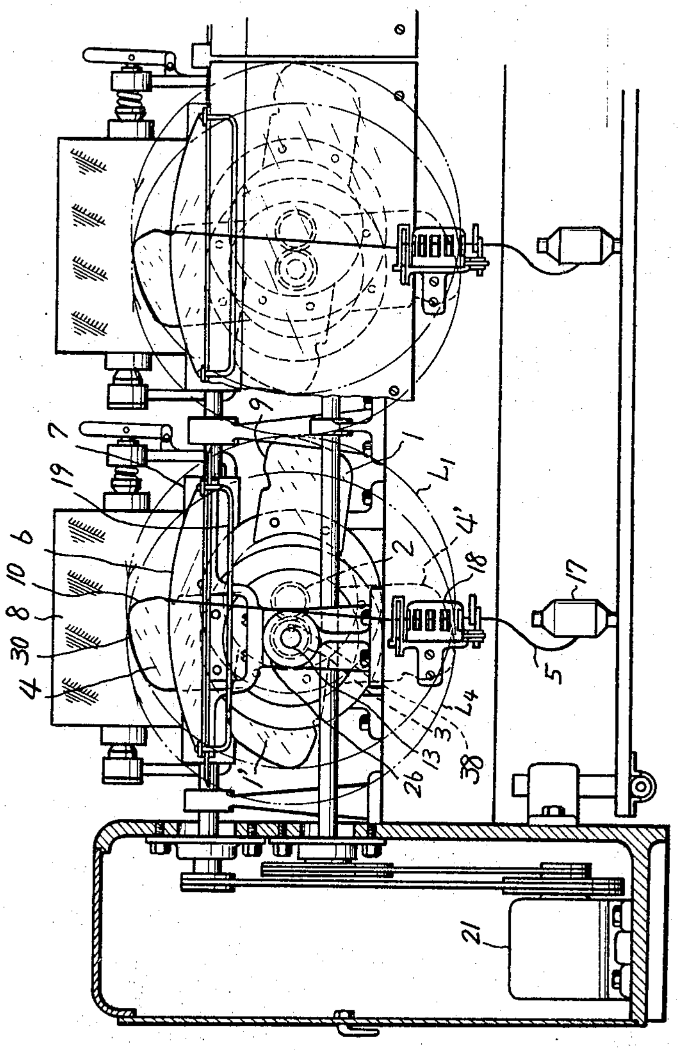
FIG. 1 is a front view of a preferred embodiment of the traverse mechanism of this invention.
Figure 2:
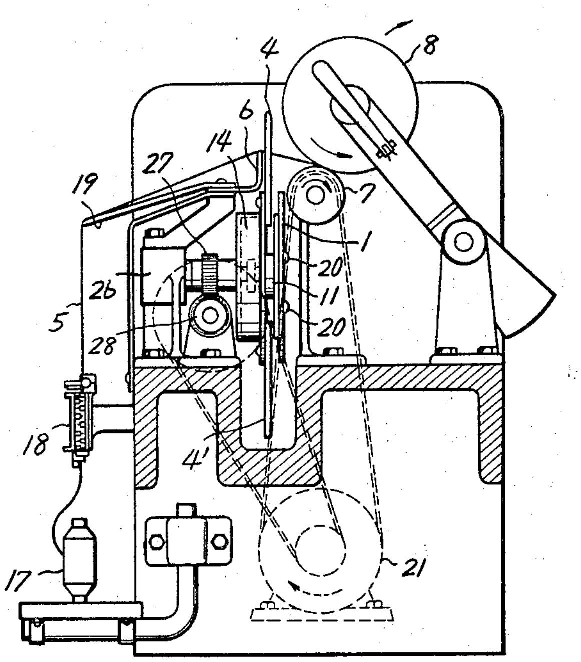
FIG. 2 is a side view of FIG. 1 as seen from the right thereof, partly taken in section.
Figure 5:
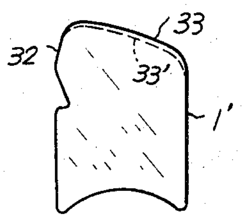

FIG. 5 is a detailed view of the forward ends of the rotary wings 1 and 1' shown in FIGS. 1 and 2.

Figure 6:
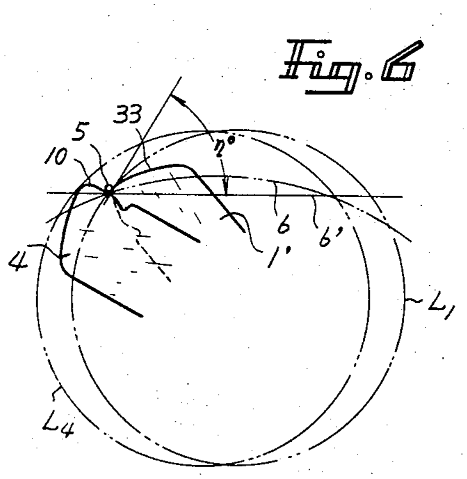

FIG. 6 depicts the locus path of the forward end 33 shown in FIG. 5.

Figure 7:
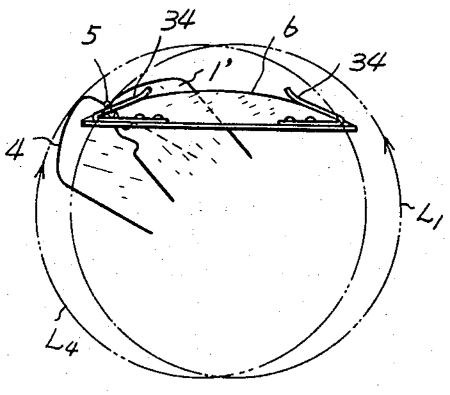

FIG. 7 depicts another embodiment of the present invention and shows a detailed illustration of the supply yarn stable means.

Figure 8:
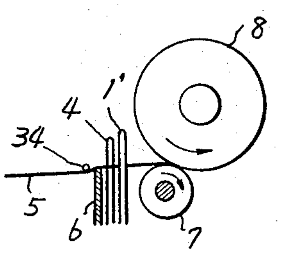

FIG. 8 is a partial side view of the embodiment of FIG. 7 showing the relative positions of the bobbin, driving roller and rotating wings.

Figure 9:
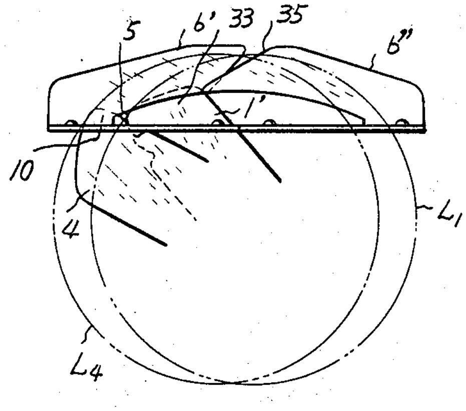

FIG. 9 depicts another embodiment of the present invention showing the locus path of the rotating wings therein.

Figure 10:
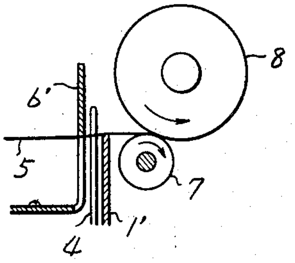

FIG. 10 is a detailed view of the embodiment of FIG. 9 showing the relative positions of the bobbin, driving roller and rotating wings.

Figure 11:
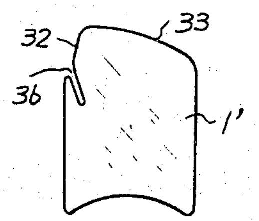

FIG. 11 is a detailed drawing of a rotating wing in another embodiment of the present invention.

Figure 12:
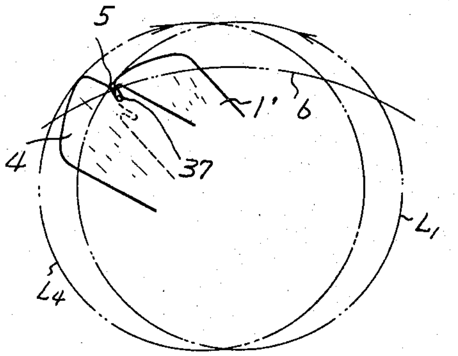

FIG. 12 shows the locus path of the rotating wing of FIG. 11.

Figure 13:
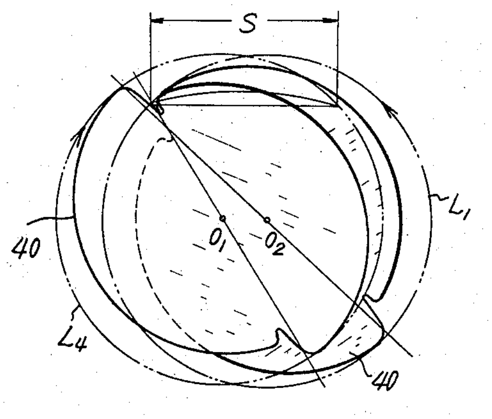

FIG. 13 shows the locus path of a rotating wing in another embodiment of the present invention.

Figure 14:
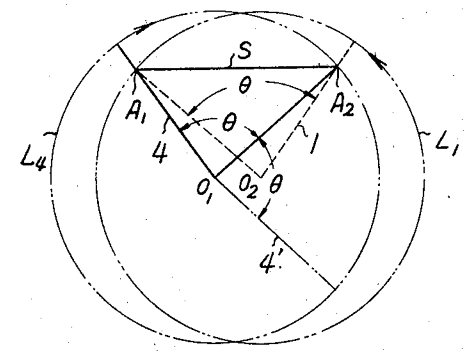

FIG. 14 depicts the relative angular positions of rotary wing 4.

Figure 15:
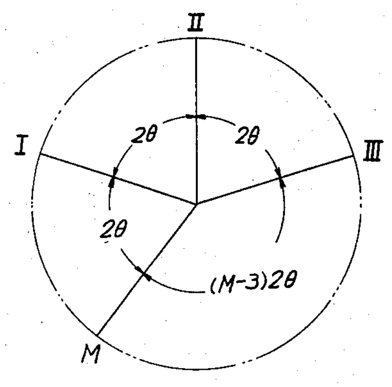

FIG. 15 depicts the relative angular positions of a plurality M of rotary wings.

Figure 16:
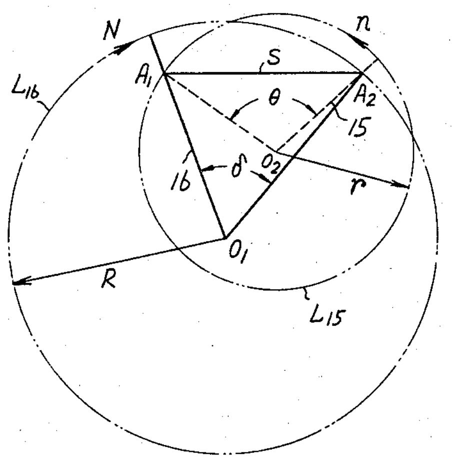

FIG. 16 depicts the relative angular positions of a plurality of rotary wings having different radii and rotating in opposite directions.

In FIGS. 1–3 showing a preferred embodiment of this invention, a filament or supply yarn 5 is fed from a bobbin 17 to a tension device 18 to obtain a tension necessary to be wound, and reaches a driving roller 7 through a guide bar 19 and a guide part 6. Then, the supply yarn 5 is wound through the traverse mechanism onto a bobbin 8 driven by the driving roller.

Figures 3A, 3B:
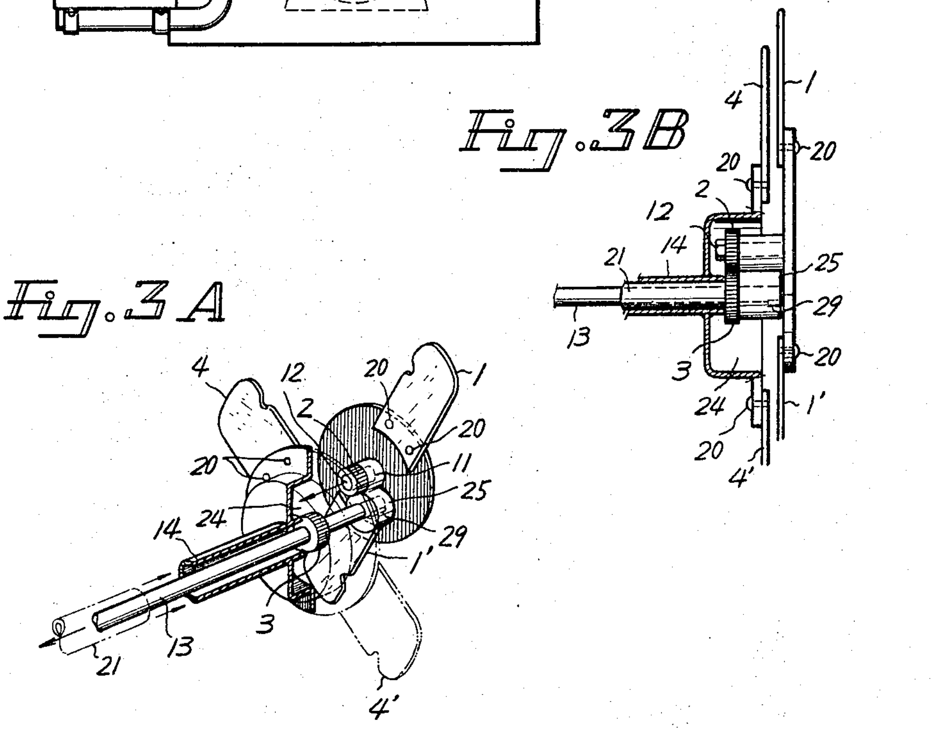
FIG. 3A shows the traverse mechanism of FIGS. 1 and 2 in perspective partial cross section.
FIG. 3B is a side elevation view of the traverse mechanism shown in FIGS. 1 and 2 showing particular details thereof in section.

The traversing motion of the supply yarn 5 is effected in opposite directions by the traverse mechanism comprising rotary wings 1, 1' and 4, 4' fixed to the ends of rotary shafts 11 and 14 having an appropriate distance between the axis centers thereof in opposite sides, front and reverse, respectively, by small set screws. A fixed shaft 13 is fixed to a bearing 26 by a small screw 38 (see FIG. 3), and a bearing 25 is fixed to an end of the fixed shaft 13 by a small screw 29 (see FIG. 1). The rotary shaft 14 is supported by its fixed shaft 13 through a ball bearing or the like, and a toothed wheel 27 is fixed to the end of the rotary shaft 14 (see FIG. 2). The toothed wheel 27 is in mesh with a toothed wheel 28 to drive it. A rotary shaft 11 is supported by a bearing 25, and an end of the shaft 11 is provided with a toothed wheel 2 by a nut 12 (see FIGS. 3A and 3B). The toothed wheels 2 and 3 of the rotary shafts are in mesh with each other in a space 24 as shown in FIG. 3 to drive the above two shafts simultaneously in opposite directions. With the rotation of these two rotary shafts 11 and 14, the forward ends of rotary wings 1, 1' and 4, 4' make a circular motion, respectively, along the loci $L_1$ and $L_4$ in the direction as shown in FIG. 1. This apparatus is provided with the guide part 6 having a convex of yarn traverse. As shown in FIG. 2, the above rotary wings 1, 1', 4 and 4' run through the gap between the guide part 6 and the driving roller 7.

In order to carry out the traverse winding of the supply yarn 5 onto the bobbin 8 by the present apparatus, each of the rotary wings 1, 1', 4 and 4' depicts the following rotary motion. For example, the rotary wing 4 rotating in the clockwise direction moves the supply yarn 5 which is now being wound and close to the forward end 10 of the rotary wing 4 from the left side of the bobbin 8 along the convex of the guide part 6 towards the right direction; as soon as the yarn 5 is off the end 10 of the rotary wing on the locus $L_4$ at the right end of the bobbin 8, the end 9 of the other rotary wing 1 rotative in the opposite diction catches this yarn to move it along the guide part 6 towards the left direction in relation to the drawing. Similarly, as soon as the supply yarn is disengaged from the end 9 of the rotary wing at the left side of the bobbin on the locus $L_1$, the yarn catches the forward end of the rotary wing 4' rotating in the opposite direction and moves in the right direction as shown in the drawing.

Figure 4:
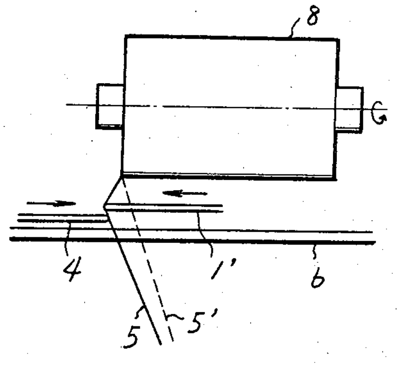
FIG. 4 is a detailed view of a portion of the traverse mechanism of FIGS. 1 and 2, showing the relative position of the bobbin and the rotating wings.

In the above manner, the supply yarn 5 is wound onto the bobbin 8 through traversing by the rotary wing 4, 4' and 1, 1'. When the supply yarn 5 is transferred by the rotary wing as described above, it is necessary for the edge line 30 of the rotary wing to construct a special form with a view to effecting a smooth operation. Further, in order to perform a smooth transfer of this supply yarn, there are several methods as follows:

In FIG. 4, when the rotary wing 1' which feeds the supply yarn 5 to the left causes the yarn 5 to come in touch with the rotary wing 4 which feeds the yarn to the right at the end of the traverse, and the forward end of the rotary wing 1' which has fed the yarn to the left goes downwardly under the touch surface of the yarn of the guide part 6, it loses the force to feed the yarn to the left, and the yarn 5 assumes a condition as shown in a dotted line 5' in FIG. 5 so that the yarn moves to the right faster than the rotary wing 4. In consequence, there occurs an unstable condition at both ends of the traverse. This phenomenon causes non-uniformity of traverse length on the bobbin on both sides of the bobbin, which results in an non-uniformity of hardness on the surface of the bobbin.

A special form of the forward ends 32 and 33 of the rotary wings 1 and 1' embodied in FIGS. 1–2 is shown in FIG. 5. The portion 32 shown in FIG. 5 is a portion where the supply yarn of the rotary wing 1' is traversed, and a dotted line 33' is the locus of intersection between the side of the opposite rotary wing 4 which feeds the supply yarn in the opposite direction and the upper face of the guide part of yarn traverse. In actual operation, in order to effect a stable touch of the yarn at the end of the traverse, as shown in FIG. 6, when in touch, the range of angle $\eta°$ should be preferred to be 30–90° at the end between a straight line 6' which connects both ends of the traverse and the side of the rotary wing, and a curve should be such as decreases gradually according to the transfer of the yarn. This curve is shown as 33 in FIG. 5. If this curve is positioned above the one 33' as shown in FIG. 5, the supply yarn is transferred in a very smooth manner at the end of the traverse. In FIGS. 1–2, the embodiments of this invention are shown in which the other rotary wings 1, 4 and 4' have the same form as the one 1'.

In the foregoing, one embodiment of the invention is described, and there is another method in the following to have the supply yarn be stable at the end of the traverse. For example, there is provided a supply yarn stable means 34 in one method shown in FIG. 7. This method is the one as shown in FIG. 8 in which the supply yarn is so bent that it will not return to its original state due to resistance resulting therefrom.

In another method as shown in FIGS. 9–10, the supply yarn is supported by three points: the forward end 10 of the rotary wing 4 which feeds the yarn to the right, the upper face 33 of the rotary wing 1' which has fed the yarn to the left, and the guide parts 6' and 6'' having the same curve as the convex of the guide part 6 described hereinbefore. By this method, a very stable transfer of yarn is effected at the end of the traverse. In reference to the slit 35 formed between the guide parts 6' and 6'', it functions as a path for feeding the supply yarn at first when traversing is carried out. At this time the guide parts 6 and 6'' have an advantage to act as a safety cover during the rotation of the rotary wing.

Another method shown in FIGS. 11–12 is directed to a balance one in which the supply yarn is placed in a slit 36 at the end of traverse. In reference to FIG. 12, it shows that when the rotary wing 1' which feeds the supply yarn 5 to the left makes a transfer to the rotary wing 4 which feeds the yarn 5 to the right at the end, the yarn 5 is placed in a slit 37 (which corresponds to the slit 36 of the rotary wing 1') in order to maintain balance and traversing.

To maintain the balance of the supply yarn at the end described above, a smooth transfer is performed by imparting a stronger resistance than the returning force of the supply yarn in transferring. Further, with the formation of an appropriate leading curve to the touch surface of travel yarn at the forward end of each rotary wing 1, 1', 4, and 4' and the convex of the guide part 6, the regulation of transfer speed of supply yarn can be easily effected so that the traverse motion can be realized.

FIG. 13 shows another method in which the guide part 6 of yarn traverse is not employed. As shown in FIG. 13, the upper face 40 of the forward end of the rotary wing is formed with such a shape as depicts the same locus as the guide part 6 of yarn traverse, therefore the guide part 6 is eliminated so as to have a simpler construction.

In every means described above, the number of rotary wings fixed to each rotary shaft 11 or 14 is selected as follows: In FIGS. 14–15, it is preferred that when the rotary wing 4 rotates in the clockwise direction about the axis center $O_1$ the wing travels from the left end $A_1$ of the traverse length S to the right end $A_2$, and the other rotary wing 1 rotates in the anti-clockwise direction about the axis center $O_2$ reaches $A_2$, and then $A_1$, the rotary wing 4 or other corresponding rotary wing should assume the position $A_1$. Then, a rotary angle or traverse angle formed to the traverse length S by the rotary wings 4 and 1 are $\theta$ in both angles, and when the rotary wing 1 reaches the position $A_1$, the rotary wing 4 still proceeds from $A_2$ to $\theta$ to assume the position 4' shown in FIGS. 14–15. As the locations 4' and $A_1$ of the rotary wing stand the angle of $2\theta$ to the axis center $O_1$, when the rotary wing 1 rotates in the anti-clockwise direction reaches from $A_2$ to $A_1$, the number $a$ of rotary wings 4 should be as follows:

$$360°/2\theta=180°/\theta=a \qquad (1)$$

The above requirement is that the rotary wing 4 or other corresponding rotary wing should assume the position $A_1$, and this can apply to the rotary wing 1 as well.

FIG. 15 shows the number M of rotary wings.

The foregoing disclosure applies to the case where the same number of rotary wings are fixed to every shaft, in other words, the rotary ratio being 1. However, where different number of rotary wings are fixed to every shaft, a smooth traverse motion is performed as same as the embodiments described hereinbefore.

In FIG. 16, let us assume as follows: one rotary wing 16 having a radius R and rotative in the clockwise direction about the axis center $O_1$, the other rotary wing 15 having a radius $r$ and rotative in the anti-clockwise direction, and $L_{16}$ and $L_{15}$ be the circular loci of rotation of the forward ends of rotary wings, respectively. Let $\delta$ and $\theta$ be traverse angles, respectively.

If the number $a_1$ of rotary wings 16 is provided on the rotary shaft to rotate N rotations per minute, and the number $a_2$ of rotary wings is provided on the rotary shaft to rotate $n$ rotations per minute, the number of cycles of right traverse of the supply yarn 5 of the rotary wing 16 will be $a_1N$ per minute, and the number of cycles of left traverse of the yarn of the rotary wing $a_2n$. As the number of rotation of the above two is equal, it shows:

$$a_1N=a_2n,\ a_1/a_2=n/N \qquad (2)$$

Therefore, the number of rotary wing varies inversely as the number of rotations. Furthermore, as the peripheral speeds of both rotary wings 15 and 16 are equal, there is a relationship:

$$2\pi RN = 2\pi rn,\ R/r = n/N \qquad (3)$$

It will be clear from the Expressions 2 and 3:

$$n/N = R/r = a_1/a_2$$

Therefore, the diameter of rotation of rotary wing and the number of rotary wings vary inversely as the number of rotation of rotary wing, in other words, the rotary wing 15 having a small diameter rotation has a smaller number of rotary wings and a large number of rotations. It follows from the Expression 1 that the rotary wing 15 can be calculated as follows:

$$a_2 = 180°/\theta$$

As fully described in the foregoing, by the traverse mechanism of this invention, neither impact of parts nor noise takes place at every reverse end of traverse motion of supply yarn so that a smooth predetermined traverse motion can be performed, whereby a safe and high speed operation of traversing adapted for a mass production of traverse winding of filamentous material can be attained.

Since it is obvious that many changes and modifications can be made in the details without departing from the nature and spirit of the invention, it is to be understood that the invention is not to be limited except as set forth in the claims.

We claim:

1. A yarn winding traverse mechanism comprising a plurality of rotary wings, two operatively connected shafts rotative in opposite directions, said rotary wings being fixed thereto, a plurality of guide parts located approximately to said rotary wings, said shafts being rotative eccentrically to transfer yarn from one to the other of said rotary wings at the end of a traverse, said rotary wings providing an angle between a side of said rotary wings and a straight line connecting both ends of the yarn traverse path, ranging between 30° to 90°, to impart a stronger resistance to said yarn than the returning force of said yarn to the center of said traverse, while transferring said yarn from one to the other of said rotary wings.

2. A yarn winding traverse mechanism comprising a plurality of rotary wings, two operatively connected shafts rotative in opposite directions, said two shafts being rotative eccentrically to transfer yarn from one to the other of said rotary wings at the end of a traverse, said rotary wings being fixed thereto, a plurality of guide parts located approximately to said rotary wings, balance means operative to bend said yarn, to impart a stronger resistance to said yarn than the returning force of said yarn to the center of said traverse while transferring said yarn from one rotary wing to the other rotary wing.

3. A yarn winding traverse mechanism comprising a plurality of rotary wings, two operatively connected shafts rotative in opposite directions, said two shafts being in the absence of the same rotative center, said rotary wings being fixed thereto, a plurality of guide parts having a slit therein for feeding the yarn to said rotary wing at the time of initial traverse, to impart a stronger resistance to said yarn than the returning force of said yarn to the center of said traverse while transferring said yarn from one to the other of said rotary wings.

4. A yarn winding traverse mechanism comprising a plurality of rotary wings, two operatively connected shafts rotative in opposite directions, said two shafts being rotative eccentrically to transfer yarn from one to the other of said rotary wings at the end of a traverse, said rotary wings being fixed thereto, a plurality of guide parts located proximately to said rotary wings, one end of said rotary wings having a slit therein, to impart a stronger resistance to said yarn than the returning force of said yarn to the center of said traverse while transferring said yarn from one to the other of said rotary wings.

5. A yarn winding traverse mechanism comprising a plurality of rotary wings, two operatively connected shafts rotative in opposite directions, said rotary wings being fixed to said shafts, said two shafts being in the absence of the same rotative center, a guide part, an upper form operative to generate the same locus path as said guide part does on the upper face of the forward end of said rotary wing, to impart a stronger resistance to said yarn than the returning force of said yarn to the center of the yarn traverse path by only said rotary wing while transferring said yarn from one to the other of said rotary wings.

References Cited

UNITED STATES PATENTS

| | | | |
|---|---|---|---|
| 834,420 | 10/1906 | Taylor | 242—43 |
| 1,475,525 | 11/1923 | Tober | 242—43 |
| 2,238,128 | 4/1941 | Nydegger | 242—43 |

FOREIGN PATENTS

| | | |
|---|---|---|
| 396,207 | 5/1924 | Germany. |
| 396,776 | 6/1924 | Germany. |

STANLEY N. GILREATH, *Primary Examiner.*